Nov. 12, 1968 TATSUO KANEKO 3,410,186
AUTOMATIC FILM SENSITIVITY SETTING MEANS FOR AN
EXPOSURE CONTROL CIRCUIT OF A CAMERA
Filed Feb. 19, 1965 2 Sheets-Sheet 1

INVENTOR.
TATSUO KANEKO
BY
Buckman and Archer
HIS ATTORNEYS

Nov. 12, 1968  TATSUO KANEKO  3,410,186
AUTOMATIC FILM SENSITIVITY SETTING MEANS FOR AN
EXPOSURE CONTROL CIRCUIT OF A CAMERA
Filed Feb. 19, 1965  2 Sheets-Sheet 2

INVENTOR.
TATSUO KANEKO
BY
Buckman and Archer
HIS ATTORNEYS

United States Patent Office 3,410,186
Patented Nov. 12, 1968

3,410,186
AUTOMATIC FILM SENSITIVITY SETTING MEANS FOR AN EXPOSURE CONTROL CIRCUIT OF A CAMERA
Tatsuo Kaneko, Yono-shi, Japan, assignor to Fuji Shashin Film Kabushiki Kaisha and Fuji Shashin Koki Kabushiki Kaisha Ashigarakami-gun, Saitama-ken, Japan, both corporations of Japan
Filed Feb. 19, 1965, Ser. No. 433,958
6 Claims. (Cl. 95—10)

ABSTRACT OF THE DISCLOSURE

An improved camera for use with film magazines wherein the sensitivity of the film is represented by a slot on the magazine, the camera including unique mechanical sensing means and a latching control thereover so that the camera is automatically adjusted to function with the particular film when the cover is closed.

The present invention relates to an automatic film sensitivity setting means for a camera using a film magazine, and particularly to such means suitable for a small movie camera having an automatic exposure control means. More particularly, the present invention relates to an automatic film sensitivity setting means which, in response to charging of a film magazine or closing of the camera cover, serves to adjust the exposure control circuit of the camera automatically in accordance with film sensitivity (such as "ASA" value or "DIN" value).

Hithertofore, it has been proposed to provide a limit portion on the film magazine which, during charging of the magazine in a camera or closing of the camera cover after charging, cooperates with a movable mechanism provided on the camera and serves to set film sensitivity automatically.

However, these prior mechanisms have some disadvantages. For example, since nonuniform force is applied during charging of the magazine, handling procedures are different for each operation, or charging pressure is limited for plastic magazine, the resultant setting becomes unstable.

Further, for the exposure control circuit where the setting is performed through switching of the electric resistance thereof by mechanical means, since only limited actuating force is obtainable by the above described prior art, the resultant setting becomes more unstable.

Accordingly, an object of the present invention is to overcome such problems and to provide a positive means which serves to set film sensitivity automatically in the exposure control circuit of the camera.

The automatic film sensitivity setting means in accordance with the present invention comprises a limit portion provided on the film magazine and corresponding to film sensitivity, a movable element adapted to engage with said limit portion, and a means for adjustment of the exposure control circuit of the camera in accordance with the movement of said movable element, characterized in that said movable element is carried on a spring biased movable lever which is arranged to be able to release from its ready position by a portion of the charged magazine and move under the influence of a spring means until said movable portion engages with the end of said limit portion.

Figures 1, 2:
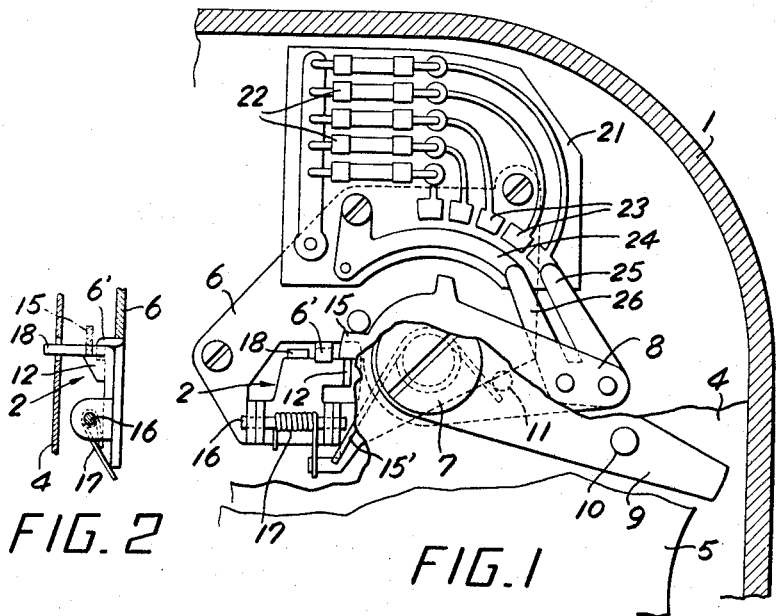
Figures 3A, 3B, 3C, 3D:
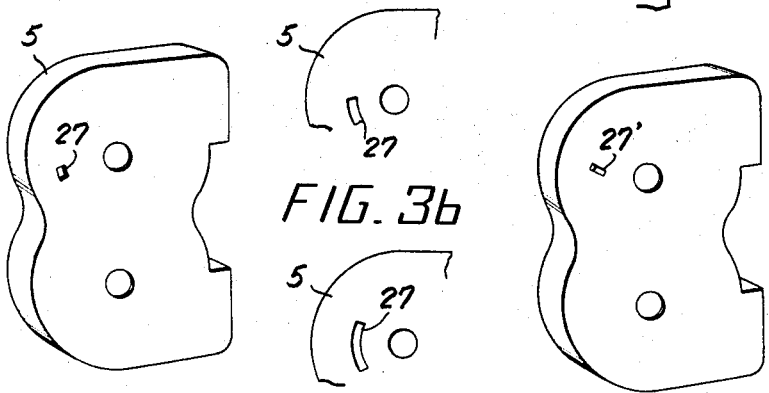
Figure 4A:
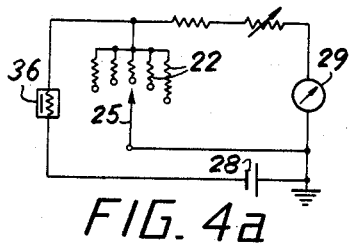
Figure 4B:
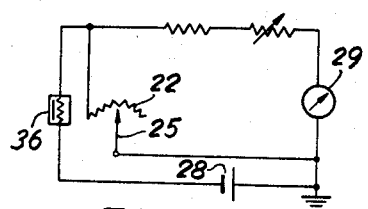
Figure 5:
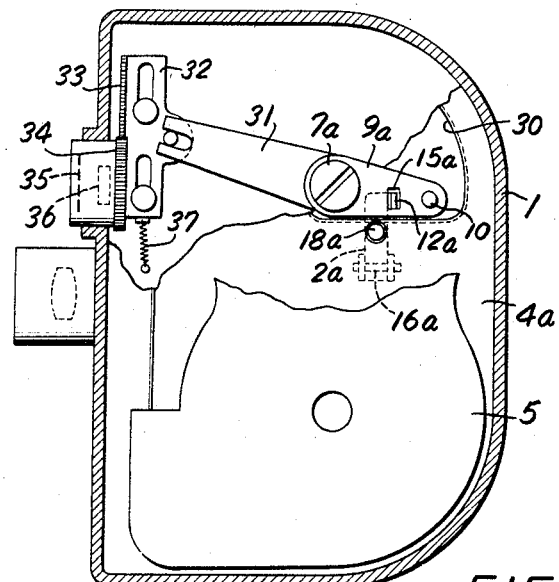
Figure 6:
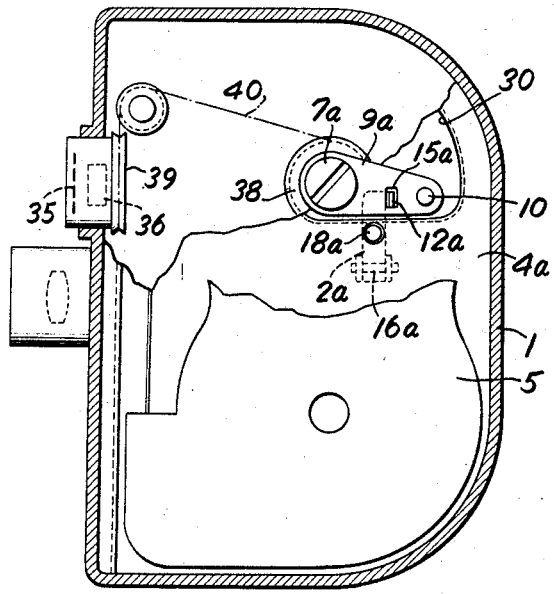
Figure 7:
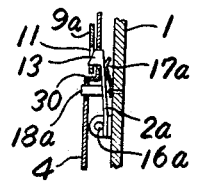

In order that the present invention may be more clearly understood and readily carried into effect, reference may now be had to the accompanying drawings in which several forms of the present invention are illustrated by way of example, and in which:

FIG. 1 is an elevational view of the internal mechanism of the camera prior to closing of the cover;
FIG. 2 is a cross-sectional view of the stopper arrangement employed in the mechanism shown in FIG. 1;
FIGS. 3a through 3d are perspective views of the film magazines each of which has suitable limit portion corresponding to the film sensitivity;
FIGS. 4a and 4b are circuit diagrams suitable for use with the mechanism shown in FIG. 1;
FIG. 5 is an elevational view of another embodiment of the present invention;
FIG. 6 is a modification of the mechanism shown in FIG. 5; and
FIG. 7 is a cross-sectional view of the stopper arrangement employed in the mechanisms shown in FIGS. 5 and 6.

Referring now to the drawings, particularly to FIG. 1, the numeral 1 shows the camera casing, and 4 shows an inner wall plate which defines the boundary of the chamber for the magazine 5. A setting plate 8 and a lever 9 cooperating therewith are rotatably secured on a shaft 7 which is provided on the base plate 6 fixed to the wall plate 4. The lever 9 has a movable element 10 of which end portion is projecting into the magazine chamber. The lever 9 is urged by a spring 15' which is acting between a pin 11 provided on the lever 9 and a portion of the base plate 6 to rotate counterclockwise. This rotation is prevented by the engagement between a lug 15 formed at the periphery of said setting plate 8 and an upright nail 12 of the stopper 2. The stopper 2 is a member which is biased to rotate about a pivot axis 16 and is engaging with a stopper element 6' formed on the base plate 6. The above-mentioned nail 12 and a push element 18 is formed on said member of the stopper 2.

The electric panel 21 comprises a plurality of resistors 22, a plurality of contacts 23 which correspond one to each resistor, and a contact 24 which is connected to the other terminal. These contacts 23 and 24 contact respectively with the electric slide elements 25 and 26 provided on the setting plate 8. The magazine 5 has a limit portion 27 which is located to be disposed at a position to align with the passage of said movable element 10. The limit portion 27 can be, for example, a groove shown in FIGS. 3a through 3c or a projection 27' shown in FIG. 3d, the length or position of which is determined in accordance with film sensitivity.

When the magazine is completely housed or the cover is closed, the push element 18 is pressed in by a portion of the magazine. Then the engagement between the nail 12 and the lug 15 is released, and the lever 9 and the setting plate 8 is rotated counterclockwise. Thus, the slide elements 25 and 26 move on the contacts 23 and 24 respectively toward left until the movable element 10 engages with one end of the limit portion 27 and further rotation is prevented. If the magazine shown in FIG. 3a is used, the movement of the movable element 10 is limited to a smaller extent than the case when the magazine shown in FIG. 3b or 3c is used, thus the slide element 25 completes the circuit at the appropriate position of the contact 23.

The resistor or resistors 22 can be either as shown in FIG. 4a or 4b, i.e., a plurality of fixed resistors or a continuously variable resistor, by means of which proper resistance can be inserted in parallel across the photoelectric panel 36 such as selenium cell or CdS cell and the battery 28 and in parallel with ammeter 29, in accordance with film sensitivity.

FIG. 5 shows another embodiment of the present invention, in which a lever 9a is rotatably mounted on the shaft 7a fixed in the recess 30 of the wall plate 4a. The lever 9a has a movable element 10 and a slot 15a which engages with a nail 12a of the stopper 2a. As shown in FIG. 7, the stopper 2a is pivotally secured by a pin 16a being urged upwardly by means of a spring 17a and has a push element 18a projecting upwardly into the magazine chamber.

An arm 31 which is secured on the lever 9a has a fork end engaging with a slide member 32 which has rack portion 33 engaging with gear portion 34 of the exposure control device for the photoelectric panel 36, such as an iris 35. The slide 32 is biased by means of a tension spring 37 to move the exposure control device for the photoelectric panel 36 to one extreme position, and thus the arm 31 and the lever 9a are urged to rotate counterclockwise but the rotation is restricted by the nail 12a engaging with the slot 15a.

When a magazine 5 is charged or the cover is closed following the charging of a magazine, the push element 18a is pressed in and the slot 15a is released from the engagement with the nail 12a, thus rotation of the lever 9a and the arm 31 is permitted. The slide 32 is moved by the action of the spring 37 rotating the lever 9a and the arm 31 until the movable element 10 engages with one end of the limit portion 27. Accordingly, the exposure control device of the photoelectric panel 36 is adjusted by the movement of the slide 32 transmitted through the engagement between the rack portion 33 and the gear portion 34.

FIG. 6 shows a modification of the embodiment shown in FIG. 5, in which swinging movement of the lever 9a is transmitted through a pulley 38 secured on the lever 9a, a cable 40 and a pulley 39 to adjust the exposure control means for the photoelectric panel 36.

As apparent from above description, the present invention provides a means by which, in response to charging of a film magazine or closing of the camera cover following to charging of the magazine, the exposure control circuit of the camera can be automatically adjusted in accordance with the film sensitivity.

The details of the structure may be modified substantially without departing from the spirit of the invention and exclusive use of such modifications as come within the scope of appended claims is contemplated.

What is claimed is:

1. An improved camera for use with film magazines having a slot representative of the sensitivity of the film therein, including a movable element adapted to be coupled to said slot, exposure control elements in said camera and means for adjustment of said exposure control elements in accordance with the movement of said movable element, said improvement comprising mounting said movable element for rotation about an axis substantially orthogonal to the plane in which said slot is disposed, a lever engaging said movable element and coupled to force rotation thereof, and latching means normally preventing rotation of said lever, said latching means being disengaged by pressure exerted parallel to said axis of rotation.

2. A camera according to claim 1 wherein the slot on the film magazine is a groove of length corresponding to film sensitivity, and said lever has a projection mounted on for slidable engagement with said groove.

3. A camera according to claim 1 wherein said exposure control elements include a variable resistance circuit, and said movable element comprises means which selectively varies electric resistance in accordance with the movement of said movable element.

4. A camera according to claim 1, wherein said latching means is mounted for rotation about an axis substantially parallel to the plane in which said slot is disposed.

5. A camera according to claim 1, wherein said exposure control elements include a photosensitive element and control means for controlling the exposure sensitivity thereof, and said movable element comprises mechanical means which modify said control means in accordance with the movement of said movable element.

6. A camera according to claim 5 wherein an iris controls the exposure of said photosensitive element and said mechanical means includes a rack and pinion mechanism which operates in response to the movement of said movable element to control the iris.

References Cited

UNITED STATES PATENTS

| | | | |
|---|---|---|---|
| 2,043,901 | 6/1936 | Mihalyi | 95—10 X |
| 2,186,613 | 1/1940 | Mihalyi | 95—10 X |
| 3,125,939 | 3/1964 | Bundschuh et al. | 95—10 |
| 3,194,132 | 7/1965 | Merwin | 95—10 |
| 3,194,133 | 7/1965 | Benson | 95—10 |
| 3,266,395 | 8/1966 | Kremp et al. | 95—10 |
| 3,266,398 | 8/1966 | Kremp et al. | 95—10 X |

NORTON ANSHER, *Primary Examiner.*

JOSEPH F. PETERS, JR., *Assistant Examiner.*